Sept. 10, 1940.   E. L. BEECHER   2,214,038
SHOCK ABSORBER
Filed June 10, 1938
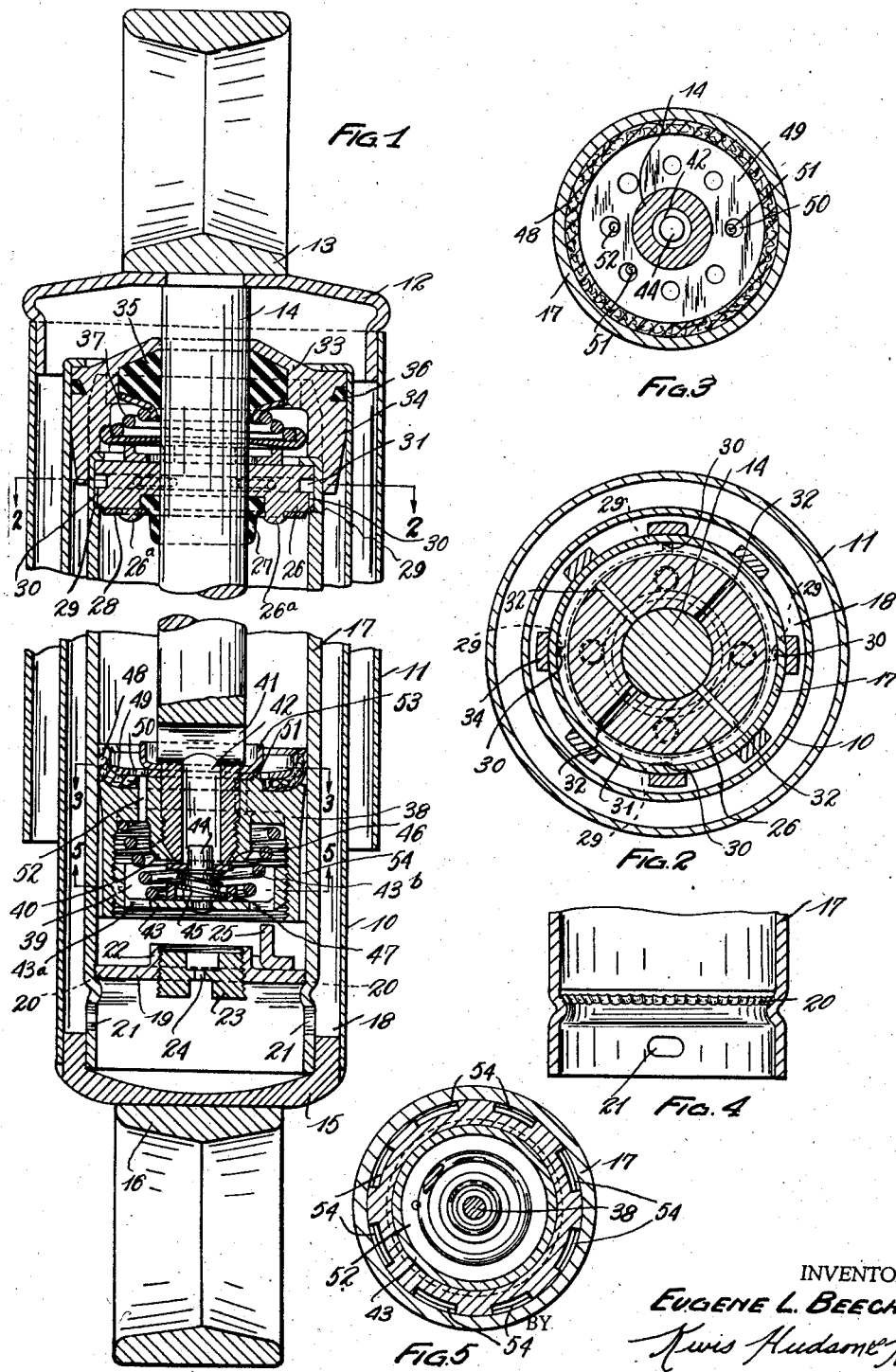
INVENTOR.
EUGENE L. BEECHER
BY
ATTORNEYS Patented Sept. 10, 1940

2,214,038

UNITED STATES PATENT OFFICE 2,214,038

SHOCK ABSORBER

Eugene L. Beecher, Cleveland Heights, Ohio, assignor to The Gabriel Company, Cleveland, Ohio, a corporation of Ohio

REISSUED
SEP 30 1941

Application June 10, 1938, Serial No. 212,995

13 Claims. (Cl. 188—88)

This invention relates to a shock absorber and particularly to a hydraulic shock absorber.

A shock absorber embodying the present invention may be employed with a variety of machines or apparatus to snub or check the velocity of movement between two relatively movable parts thereof, but inasmuch as the shock absorber of the present invention has particular adaptability and utility when used in motor vehicles, it will be so described herein.

It will also be understood that although the invention is shown applied to a direct double acting hydraulic shock absorber, certain or all of its features might be employed in other types of hydraulic shock absorbers and it is not the intention to limit the invention to the first named type.

An object of the invention is to provide a hydraulic shock absorber which is quiet and efficient in operation.

Another object is to provide in a hydraulic shock absorber improved valve means for controlling the displacement of the oil or other liquid in the working or pressure chamber from one side of the piston to the opposite side thereof during the operation of the shock absorber and which valve means is free of all hissing, whistling, rattling or other sounds.

A further object of the invention is to provide in a hydraulic shock absorber an improved and novel piston, as well as improved and novel valve means for controlling the passage of oil or liquid therethrough or therearound and which piston is so constructed that it need have only a sliding working fit in the cylinder in which it operates, as distinguished from a close fit therein, which fact, together with the fact that the piston does not contact the cylinder wall throughout the entire circumferential area of the piston, reduces the friction between the piston and cylinder and consequently the wear on these parts.

A further object is to provide a direct acting hydraulic shock absorber of the type having a working or pressure cylinder and a reservoir for the oil or liquid in communication with said cylinder, and which shock absorber is so constructed that said cylinder and reservoir are adequately and effectively sealed against the escape of oil or liquid therefrom or the entrance of dust, dirt and other foreign matter therein.

A still further object is to provide a hydraulic shock absorber of the type having a working or pressure cylinder and a reservoir for the oil cr liquid in communication therewith, and which is so constructed that a pneumatic pressure head will be built up in the reservoir during the relative movement of the piston in the cylinder in one direction, and said pressure head will act to force oil or liquid from the reservoir into the working cylinder during the relative movement of the piston and cylinder in the opposite direction.

Another object is to provide in a hydraulic shock absorber improved means for assembling and locking a closure member in one end of the pressure or working cylinder thereof.

Another object is to provide in a direct acting shock absorber improved means for preventing the aspiration of oil or air around the piston rod where it extends through a closure at one end of the pressure or working cylinder, in combination, with improved means for collecting such oil foam as may be created at said end of the cylinder and utilizing this foam and the pressure in the cylinder to provide pressure lubrication for the piston rod and its bearing in the cylinder closure.

Further and additional objects and advantages not hereinbefore referred to will become apparent hereinafter during the detailed description which is to follow of an embodiment of the invention.

Referring to the accompanying drawing illustrating said embodiment of the invention, Fig. 1 is a substantially central longitudinal sectional view through the shock absorber.

Fig. 2 is a transverse sectional view taken substationally on line 2—2 of Fig. 1 looking in the direction of the arrows.

Fig. 3 is a transverse sectional view through the working or pressure cylinder and the piston and is taken substantially on line 3—3 of Fig. 1 looking in the direction of the arrows.

Fig. 4 is a detached fragmentary elevational view of the lower end of the pressure or working cylinder of the shock absorber, and Fig. 5 is a transverse sectional view through the pressure or working cylinder and the piston and is taken substantially on line 5—5 of Fig. 1 looking in the direction of the arrows.

The shock absorber embodying the present invention and illustrated in the accompanying drawing is shown as of the direct double acting hydraulic type and comprises a cylindrical casing 10 which has relative telescoping movement within a cylindrical housing 11 that is spaced radially outwardly from the casing 10.

The upper end of the housing 11 is closed by an inverted cup-shaped closure or cap member 12 and is provided on its outer side with an eye 13 to which the piston rod 14 of the shock absorber is also connected. The lower end of the casing 10 is closed by a cup-shaped closure member 15 which has secured to its outer side a lower eye 16. The closure members 12 and 15 extend into the housing 11 and casing 10, respectively, and are secured thereto by welding or by other suitable means.

In mounting the shock absorber upon a motor vehicle similar mounting pins or trunnion rods (not shown) may be connected, respectively, to the frame and axle of the vehicle in any suitable manner so as to extend outwardly therefrom in parallel relation and pass through the eyes 13 and 16. These pins or rods may be operatively connected with the eyes 13 and 16 by suitable means well known in the art, wherefore relative movement between the frame and axle of the vehicle will cause relative telescoping movement between the casing 10 and housing 11 as will be well understood.

The pressure or working cylinder 17 of the shock absorber is disposed within the casing 10 in spaced concentric relationship therewith, so that the space defined by the casing 10, cylinder 17, closure member 15 and closure member for the upper end of the casing (later to be referred to) constitutes a reservoir 18 for the oil or liquid in the shock absorber.

The lower end of the cylinder 17 extends into the cup-shaped member 15 and is secured thereto by the end pressure caused by the spinning over of the upper end of the casing 10. The cylinder 17 upwardly of its lower end has secured therein a closure plate 19.

In order to provide an efficient and economical way for assembling and locking the closure plate 19 in position said plate has its circumference provided with serrations, wherefore the plate can be positioned in the cylinder and then the lower end of the cylinder can be contracted and an annular serrated groove 20 formed therein adjacent the closure plate 19, with the result that the serrations of the plate and groove interlock and the plate is held in liquid sealing relationship with the inner wall of the cylinder. The cylinder 17 below the serrated groove 20 is provided with one or more openings 21 placing that portion of the cylinder below the closure plate 19 in communication with the reservoir 18.

The closure plate 19 is provided with a centrally disposed opening surrounded by an internally threaded boss 22 and into which a threaded plug 23 is screwed, said plug being provided with a small centrally located opening 24 for a purpose later to be explained. The closure plate 19 also has secured to its inner side an inwardly projecting finger 25 that cooperates with an adjustable part carried by the piston for the purpose of adjusting the tension of a valve spring as will later be explained.

The upper or high pressure end of the cylinder 17 is closed by a plug member 26 which fits into the cylinder and is suitably secured in position therein, it being noted that the upper edge of the cylinder is turned inwardly over the outer side of the plug member. The member 26 is provided with a centrally disposed opening arranged concentrically with a counterbore on the inner side of the member and in which is located a flanged portion of an elastic sleeve 27. The sleeve 27 is held in position by a thin plate 28 secured to the inner side of the member 26 by suitable means, such as the integral rivet-like portions 26a that extend through openings in the plate 28 and then have their ends upset against the plate.

The piston rod 14 extends through the central opening in the member 26 and through the elastic sleeve 27. The elastic sleeve 27 tightly grips the piston rod and acts as a seal to prevent oil and air working out of the cylinder 17 along the piston rod 14. In other words, the elastic sleeve 27 eliminates likelihood of any uncontrolled air passages between the piston rod and the wall of the opening in the member 26. If such passages existed the result would be an atomization of oil foam through the passages to the outside of the cylinder, and this would cause an undesirable hissing or whistling noise in the operation of the shock absorber. The elastic sleeve 27 will always tightly grip the piston rod, and even though considerable clearance should eventually be present between the rod and the wall of the opening in the member 26 due to wear of the parts, the sleeve will still adequately function as a seal to close the passage around the piston.

The plate 28 has its circumference terminating slightly inwardly of the circumference of the member 26, while said member 26 is provided adjacent its inner side and on its circumference with circularly spaced inclined notches 29 that merge at their upper ends into small grooves 30. The grooves 30 have their upper ends in communication with an annular channel 31 formed in the circumference of the member 26 substantially midway between the outer and inner ends of the member. Communicating with the channel 31 are a plurality of circumferentially spaced radially extending small passages or bores 32 that terminate in the central opening of the member 26, see Fig. 2. The purpose of the notches 29, grooves 30, channel 31 and bores or passages 32 will be pointed out hereinafter.

The upper end of the casing 10 is closed by a closure member 33 mounted in the casing and suitably connected thereto. The closure member 33 is provided with inwardly extending portions 34 that contact with the upper end of the cylinder 17, as clearly shown in Fig. 1. The member 33 is also provided with a centrally disposed recess in which is arranged a gasket 35. The piston rod 14 extends through this gasket 35 and through a centrally located opening in the member 33. The member 33 is provided with a peripheral groove in which is mounted a packing ring 36 located within the casing 10 and forming a tight seal between the casing and the member 33. The gasket 35 is held under compression by a coiled spring 37 acting on the tapered inner end of the gasket, as clearly shown in Fig. 1, but since this particular detail forms no part of the present invention it is not believed necessary to describe the same further.

The piston rod 14 has secured to its lower end a piston 38 and said piston on its lower side is provided with a cylindrical recess 39 at the inner end of which is a centrally located extension 40 that surrounds the lower end of the piston rod and is locked thereto. A transverse opening 41 is formed in the piston rod 14 above the piston and communicates with a longitudinally extending passage 42 that extends to the lower end of the piston rod and is in communication with the recess 39 in the piston.

An externally threaded cup-shaped plug 43 is screwed into the recess 39 of the piston and the tension of a relatively stiff coil spring 43b mounted in the recess 39 and having one of its ends abutting against the bottom of the cup-shaped plug 43 serves to lock the plug in its different adjusted positions.

Rigidly connected to the bottom of the plug 43 is a centrally disposed pin 44 that extends upwardly into the passage 42 in the piston rod. A small coil spring 45 surrounds the pin 44 and has its upper end abutting against a plate valve 46 that is slidably mounted on the pin 44 and is held by the spring 45 normally seated against the lower end of the piston rod and seals the passage 42.

This arrangement of the pin 44 and valve 46 possesses a decided advantage. Flap valves ordinarily have a tendency to crack open on one side first, with the result that in order to accommodate the volume of expelled fluid the movement of the valves sidewise is more than if the valves had opened evenly. This sidewise opening movement of the valves causes valve flutter and often produces in shock absorbers thumping noises. The use of adequate guides for the valves may correct this fault, but the guides cause objectionable weight to be introduced into the shock absorber.

In the present construction the pin 44 has a relatively large diameter, and since it extends into the passage 42 an annular space is provided between the pin and the wall of the passage. Therefore the valve 46 has an exposed pressure area of annular shape and located substantially near the circumference of the valve, wherefore there will be an even pressure distribution on the valve 46 and the latter will move to and from its seat in parallel relation to the axis of the pin 44. Also since the area of the valve is reduced by the area of the pin 44 a much lighter spring pressure is required for the expelled volume of oil.

A ring 47 also surrounds the pin 44 and is for the purpose of preventing a complete collapse of the spring 45 when the valve 46 is moved to closed position upon manual adjustment. The movement of the valve under pressure of the oil is only a few thousandths of an inch.

The plug member 43 is provided with a plurality of openings 43a which can be engaged by the finger 25 on the closure member 19 when the piston is in its most inward position, so that relative rotation between the cylinder 17 and the piston will cause the member 43 to be screwed inwardly or outwardly of the recess 39, with a resultant change in the tension of the spring 45 and consequently in the pressure required for opening the valve 46.

A flexible cup packing ring 48, preferably formed of leather, is arranged on the upper side of the piston 38 and is held in position thereon by means of a plate 49 that has a plurality of openings 50 formed therein and through which extend integral pin-like portions 51 formed on the upper side of the piston 38. A small passage 52 extends through the piston 38 and communicates with one of the openings 50, wherefore the space in the cylinder above the piston is in constant communication with the recess 39 and the space in the cylinder below the piston. A small cup-shaped ring 53 is locked in position on the piston rod 14 just above the plate 49 and this cup-shaped ring is of such size as to partially surround the opposite ends of the opening 41 in the piston rod and it acts as a stop when the shock absorber is fully extended to prevent damage to the elastic sleeve 27 and the cup packing ring 48.

The piston 38 is provided on its periphery with a plurality of longitudinally extending relatively broad grooves 54 which are spaced circumferentially of the piston and which, as clearly indicated in Figs. 1 and 5, are of gradually diminishing depth from a point substantially midway of their ends to their upper ends. The grooves 54, however, at their upper ends are not of such depth as to allow the flexible cup packing 48 to be forced into the grooves by the pressure of the oil or liquid in the upper part of the cylinder during the operation of the shock absorber, but are so proportioned as to back up the cup packing and prevent such an occurrence.

Assuming that the shock absorber of the construction shown in Fig. 1 and which has just been described has its opposite ends connected to the axle and frame of a motor vehicle, it will be understood that relative movement of the axle and frame toward each other will cause a relative downward movement of the piston 38 in the cylinder 17 and, of course, a compression of the vehicle springs. During this relative downward movement of the piston 38 in the cylinder 17 the oil or liquid below the piston can flow through the passage 52 in the piston to the opposite side thereof. Also oil will flow through the grooves 54 in the periphery of the piston and its pressure will cause it to pass between the flexible cup packing ring 48 and the wall of the cylinder. In addition, some of the oil below the piston and at least in an amount equivalent to the oil displaced by the piston rod 14 as the piston moves inwardly of the cylinder will flow through the opening 24 in the plug 23 and hence through the openings 21 into the reservoir 18. This oil flowing into the reservoir 18 produces a compression of the air in the reservoir above the oil level and since the upper end of the casing 10 is thoroughly sealed a relatively high pneumatic pressure head is established at the upper side of the reservoir.

It is desirable in designing shock absorbers to provide for an increasing built-up resistance at or near the end of the compression or impact stroke, so that when the shock absorbers are installed on an automobile the axle will be prevented in its upward movement under load impacts from "bottoming" against the frame of the vehicle.

It is contemplated in constructing shock absorbers embodying the present invention to build into the shock absorbers suitable pneumatic pressure heads to provide the desired increasing resistance at or near the impact or compression stroke of the shock absorbers. This may be accomplished as follows:

In finally assembling the shock absorbers the pistons thereof are extended with relation to the cylinders to the maximum limit of their extended movement. The correct amount of oil is then introduced into the cylinders and the reserve or reservoir chambers, such that the oil in the reservoir chambers extends well up into said chambers and thus forms therein an oil piston and a pneumatic compression chamber above the oil piston. Then while the shock absorbers are in the extended position they are hermetically sealed, with the result that the pneumatic compression chambers above the oil pistons in the reservoir chambers are then at atmospheric pressure. It will be appreciated that different effects of the increasing resistance at or near the end of the compression stroke can be obtained by varying the amount of oil introduced into the shock absorber, since the height of the oil in the reservoir or reserve chambers will change the effect of the pneumatic compression chambers located above the oil pistons.

It will be understood that if it is desired to cause the pneumatic compression chamber to be at less than atmospheric pressure when the piston and cylinder are in the fully extended position that then the hermetical sealing of the shock absorber need not be made at the fully extended position. On the other hand, if it is desired to have a pneumatic compression chamber which in the fully extended position is at greater than atmospheric pressure, then gas forming chemicals might be introduced into the shock absorber to bring about this effect.

It will be understood that when the piston rod moves into the cylinder under an impact stroke, oil is displaced and flows into the reservoir chamber and causes the oil therein to rise into the space which forms the pneumatic compression chamber. This raises the pressure of air or gas and results in a pneumatic resistance which supplements the hydraulic resistance, and eventually as the end of the impact or collapsing stroke approaches the pneumatic resistance will have been built up to a resistance greater than the hydraulic resistance and will act to prevent "bottoming" of the axle.

In installing shock absorbers on automobiles it is the general practice to allow more recoil stroke than compression or impact stroke in the normal or riding position. Therefore, on a shock absorber having a total stroke of six inches, for example, the piston could be moved approximately four inches on the recoil stroke and two inches on the compression or impact stroke and the pneumatic compression chamber would be considerably above atmospheric pressure at the normal riding position.

When the axle and the frame of the vehicle start to separate or move away from each other under the recoil action of the vehicle spring, the piston 38, of course, moves relatively upwardly in the cylinder 17. As the piston moves upwardly the pneumatic pressure head in the reservoir acts on the oil therein to force the same through the opening 24 and into the cylinder below the piston, thus eliminating any tendency for a vacuum to be created below the piston in the lower end of the cylinder. The oil in the cylinder above the piston as the piston moves upwardly can at first only flow to the lower side of the piston through the passage 52, it being understood that the pressure of the oil in the flexible cup-shaped packing 48 causes said packing to tightly engage the wall of the cylinder and prevent any flow of oil between the packing and the cylinder and through the grooves 54. Also during this upward movement of the piston the plate valve 46 remains seated until the pressure of the oil in the upper end of the cylinder and in the opening 41 and passage 42 reaches a predetermined point sufficient to overcome the tension of the spring 45, whereupon the valve 46 will unseat and allow this high pressure oil to flow from the passage 42 to the other side of the piston. As previously stated, the tension of the spring 45 can be adjusted without the necessity of removing the piston from the cylinder by merely engaging the finger 25 of the closure member 19 in an opening 43a of the plug member 43 and then relatively rotating the cylinder and piston.

It will be noted that in addition to the piston being provided with a fixed passage through which the oil can flow from one side of the piston to the other during its movement in either direction, it is also provided with valve means for allowing a greater flow of oil from one side of the piston to the other when the piston is moving downwardly in the cylinder, that is toward the low pressure end than is the case when it is moving upwardly toward the high pressure end.

This valve means being formed of the flexible cup packing 48 and the grooves 54 is highly efficient, and since there are no movable metal parts the valve means is totally quiet in operation. In addition, the piston 38 only has portions of its periphery in engagement with the wall of the cylinder, that is the portions intermediate the grooves 54, wherefore friction between the piston and cylinder is at a minimum thus reducing the relative wear between the parts. Likewise, because of the use of the flexible cup packing 48 it is unnecessary to provide as close or tight a fit between the piston and cylinder as would ordinarily be the case.

As the piston moves upwardly in the cylinder any oil foam or emulsification of the oil above the piston caused by the compression of the entrained air therein will pass through the grooves 29 and into the annular chamber 31 in the member 26. In other words, the chamber 31 will act as a collecting chamber for oil foam and the pressures in the cylinder and in the chamber 31 will cause small quantities of this oil foam to be forced under pressure through the small passages or bores 32 against the piston rod 14, thus providing forced or pressure lubrication for the rod. During the downward movement of the piston in the cylinder, oil which has accumulated in the chamber 31 will be drawn back into the cylinder.

From the foregoing it will have been seen that a hydraulic shock absorber embodying the present invention will be quiet and efficient in operation and that the valve means for controlling the displacement of the oil or other liquid in the working or pressure chamber from one side of the piston to the opposite side thereof will be free of hissing, whistling, rattling or other sounds. It will also be seen that the piston is of improved and novel construction, as well as the valve means associated therewith for controlling the passage of oil or liquid therethrough or therearound.

The construction of the piston and valve means is such that the piston need have only a sliding working fit in the cylinder as distinguished from a close fit therein, which fact together with the fact that the piston does not contact the cylinder wall throughout the entire circumferential area of the piston reduces the friction between the piston and cylinder and consequently the wear on these parts.

Although a preferred embodiment of the invention has been illustrated and described herein, it will be understood that the invention is susceptible of various modifications and adaptations within the scope of the appended claims.

Having thus described my invention, I claim:

1. A hydraulic shock absorber comprising relatively reciprocable cylinder and piston members, said piston member being provided with a passage extending between the opposite ends thereof, a flexible cup-shaped packing ring carried by said piston and overlying one end of said passage and having its wall portion engaging the cylinder wall whereby said ring seals said passage during movement of the piston in one direction, said piston being provided with a second and constantly open passage extending therethrough, said piston also being provided with a third passage therethrough, and a spring controlled valve sealing said third passage when the pressure of the liquid therein is below a predetermined point during movement of said piston in said one direction.

2. A hydraulic shock absorber comprising a cylinder, a piston relatively reciprocable therein and provided with a peripheral passage extending from end to end thereof and having a portion adjacent one end of said piston of gradually diminishing depth, and a flexible cup-shaped packing ring mounted on said end of said piston and overlying the end of said portion of said passage and having its wall portion engaging the cylinder wall whereby said ring seals said passage during movement of the piston in one direction.

3. A hydraulic shock absorber comprising a cylinder, a piston relatively reciprocable therein and provided with a plurality of circumferentially spaced peripheral grooves extending from end to end of the piston and of gradually diminishing depth adjacent one end of the latter, and a flexible cup-shaped packing ring mounted on said end of said piston and overlying said grooves and having its wall portion engaging the cylinder wall whereby said ring seals said grooves during movement of the piston in one direction.

4. A hydraulic shock absorber comprising a cylinder, a piston relatively reciprocable therein and provided with a plurality of circumferentially spaced peripheral grooves extending from end to end of the piston, a flexible cup-shaped packing ring mounted on one end of said piston and overlying one end of said grooves and having its wall portion engaging the cylinder wall whereby said ring seals said grooves during movement of the piston in one direction, said piston being provided with passages therethrough one of which is constantly open and another normally closed, and a spring controlled valve sealing said last named passage when the pressure of the liquid therein is below a predetermined point.

5. A hydraulic shock absorber comprising a cylinder, a piston relatively reciprocable therein and provided with a plurality of longitudinal peripheral recesses of relatively broad width extending from end to end of the piston and spaced circumferentially thereof, said recesses being of gradually diminishing depth toward one end of said piston, and a flexible cup-shaped packing ring mounted on said end of said piston and overlying the end of said recesses and having its wall portion engaging the cylinder wall whereby said ring seals said recesses during movement of the piston in one direction.

6. A hydraulic shock absorber comprising a cylinder provided with a closure plug at one of its ends having a centrally disposed opening, a piston relatively reciprocable in said cylinder and provided with a piston rod extending through said centrally disposed opening in said closure plug, said closure plug being provided intermediate its ends with an annular peripheral recess forming a chamber and with a relatively small peripheral passage placing said chamber in communication with said cylinder.

7. A hydraulic shock absorber comprising a cylinder, a closure plug at one end of said cylinder provided with a centrally disposed opening, a piston relatively reciprocable in said cylinder and provided with a rod extending through said centrally disposed opening, said closure plug being provided intermediate its ends with an annular peripheral groove forming a chamber and with a port extending radially from said central opening to said chamber, said closure plug also being provided with a relatively small passage placing said chamber in communication with said cylinder.

8. A hydraulic shock absorber comprising a cylinder, a closure plug for one end of the cylinder and provided with a centrally disposed opening and with an elastic sleeve extending inwardly of the cylinder and aligned with said opening; a piston relatively reciprocable in said cylinder and provided with a piston rod extending through said sleeve and said opening, said closure plug being provided intermediate its ends with an annular peripheral groove forming a chamber and with a port extending radially from said opening to said chamber, said closure plug also being provided with a relatively small peripheral passage placing said chamber in communication with said cylinder.

9. A hydraulic shock absorber comprising relatively reciprocable cylinder and piston members, a closure member for one end of said cylinder and provided on its circumference with serrations, said cylinder having formed therein adjacent said closure member an internal annular serrated groove the serrations of said groove and said closure member being interlocked to retain the latter in position.

10. In a hydraulic shock absorber, a cylinder, a piston relatively movable in the cylinder and provided with a passage extending through it and having at one of its ends a valve seat, a pin carried by said piston and extending into said one end of said passage and providing a predetermined annular space between the periphery of the pin and the wall of the passage, a disk valve mounted on said pin, and a spring acting on said valve and maintaining the same normally seated against said valve seat.

11. In a direct acting hydraulic shock absorber, an elongated cylinder, a piston reciprocable therein, a rod extending into the cylinder at one end thereof for actuating the piston, a reservoir having restricted communication with the cylinder adjacent its other end and into which liquid is forced by movement of said rod into the cylinder, said piston having peripheral grooves extending from end to end thereof for flowing liquid past the piston upon movement of the latter toward said other end of the cylinder, a flexible cup-shaped packing mounted on the piston and overlying one end of said grooves and having its annular wall portion engaging the cylinder wall whereby said packing seals said grooves during movement of the piston toward said one end of the cylinder, said piston also having a constantly open passage of restricted size therein placing in communication with each other the portions of the cylinder on opposite sides of the piston and a third passage of relatively larger size also connecting said cylinder portions with each other, and a spring controlled valve sealing said third passage during movement of the piston toward said other end of the cylinder and adapted to be unseated by a predetermined pressure of the liquid during movement of the piston toward said one end of the cylinder.

12. In a direct acting hydraulic shock absorber, an elongated cylinder, a piston reciprocable therein, a rod extending into the cylinder at one end thereof for actuating the piston, a reservoir having restricted communication with the cylinder adjacent its other end and into which liquid is forced by movement of said rod into the cylinder, said piston having peripheral grooves extending from end to end thereof and of gradually diminishing depth for flowing liquid past the piston upon movement of the latter toward said other end of the cylinder, and a flexible cup-shaped packing mounted on the piston and overlying one end of said grooves and having its annular wall portion engaging the cylinder wall whereby said packing seals said grooves during movement of the piston toward said one end of the cylinder.

13. A hydraulic shock absorber comprising relatively reciprocable cylinder and piston members, said piston member being arranged in and contacting said cylinder and being provided with a passage therethrough which has one of its ends terminating at the periphery of the piston, said piston also being provided with a second and constantly open passage therethrough, said passages placing the portions of the cylinder on opposite sides of said piston in communication with each other, a flexible cup-shaped packing ring carried by said piston and overlying said one end of said first named passage and having its wall portion engaging the cylinder wall whereby the pressure of the liquid against said ring during relative movement of the piston and cylinder in one direction causes said ring to seal said passage, means associated with one of said members and providing a third passage placing the portions of the cylinder on opposite sides of the piston in communication with each other, and a spring controlled valve sealing said third passage when the pressure of the liquid therein is below a predetermined point.

EUGENE L. BEECHER.